United States Patent [19]
Slonina et al.

[11] 4,221,622
[45] Sep. 9, 1980

[54] METHOD OF OBTAINING FIBRE SUBSTRATES INTENDED FOR THE PRODUCTION OF COMPOSITE BODIES

[75] Inventors: Jean-Pierre Slonina, Le Vesinet; Pierre Girard, Saint Gratien; Jacques Boucher, Argenteuil; Joseph Gellon, Glichy, all of France

[73] Assignee: Le Carbone-Lorraine, Paris, France

[21] Appl. No.: 927,567

[22] Filed: Jul. 24, 1978

[30] Foreign Application Priority Data

Jul. 29, 1977 [FR] France .................................. 77 23375

[51] Int. Cl.² .......................... B32B 7/08; B32B 31/16
[52] U.S. Cl. ..................................... 156/93; 112/403; 112/417; 156/92; 156/148; 156/252; 428/102; 428/137; 428/223; 428/239; 428/902
[58] Field of Search ................... 156/92, 93, 148, 155, 156/252; 428/102, 137, 223, 238, 239, 902; 112/403, 417

[56] References Cited

U.S. PATENT DOCUMENTS

| | | | |
|---|---|---|---|
| 3,837,985 | 9/1974 | Chase | 428/223 |
| 4,059,468 | 11/1977 | Bouillon | 156/93 |

*Primary Examiner*—John T. Goolkasian
*Assistant Examiner*—Robert A. Dawson
*Attorney, Agent, or Firm*—Brisebois & Kruger

[57] ABSTRACT

Fibrous substrates intended for the production of composite bodies are produced from sheet material consisting of fibrous filaments or threads bound into a coherent sheet with a binder by providing fine, substantially uniformly sized and distributed perforations in at least selected areas of the coherent sheet, subdividing the perforated sheet into a plurality of substantially identical smaller flat sheets each comprising at least one of said selected areas, stacking the smaller sheets one upon another so that in the resulting stack the perforations in one sheet overlie the perforations in the immediately underlying sheet and thus form passages through the stack and thereafter threading through said passages in said stack strands or rods formed from fibrous filaments or threads which have been bound together with a binder.

11 Claims, 1 Drawing Figure

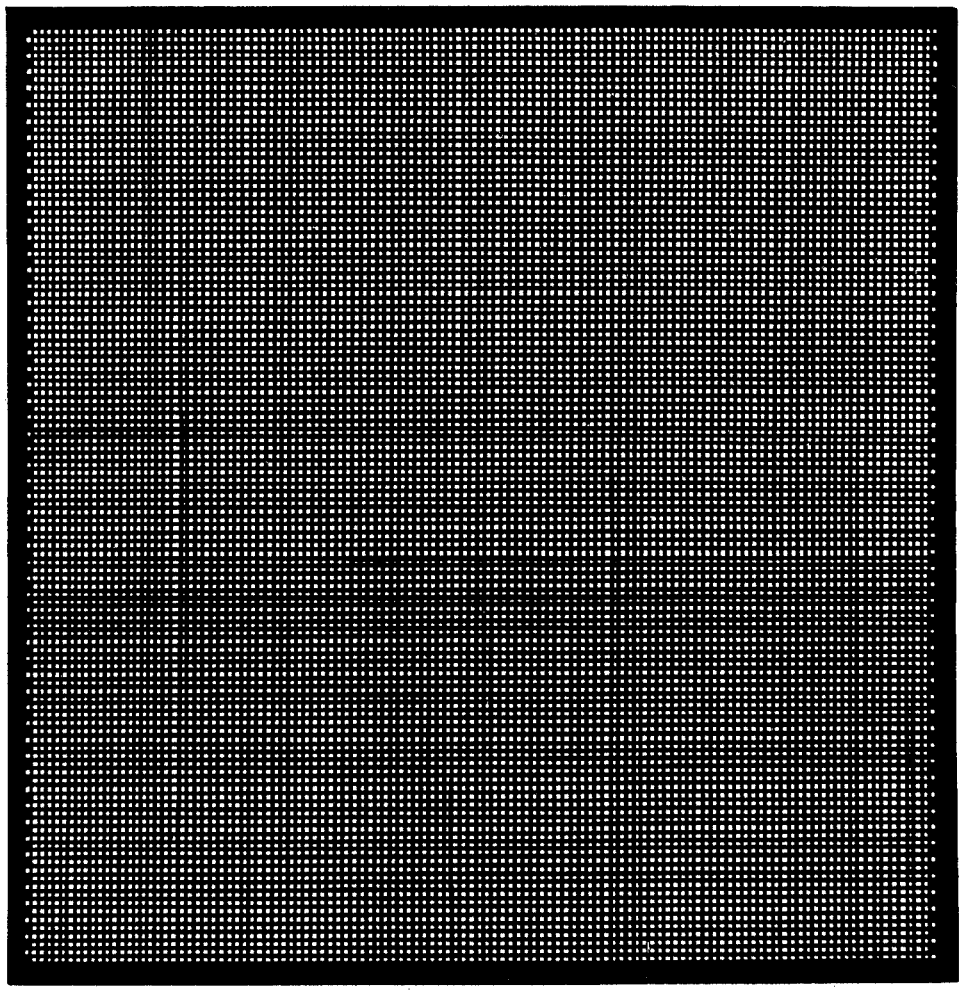

METHOD OF OBTAINING FIBRE SUBSTRATES INTENDED FOR THE PRODUCTION OF COMPOSITE BODIES

The present invention relates to a method of obtaining fibrous substrates intended for the production of composite bodies, and in particular carbon-carbon composite bodies. It may be used to produce isotropic composite bodies.

BACKGROUND OF THE INVENTION

Generally, a composite body is produced from a fibrous substrate the interstitial cavities of which are filled with a coating material. In the case of a carbon-carbon composite body, for example, a substrate of carbon fibres may be impregnated with (a) a resin which is then polymerised and pyrolysed, or (b) with a pitch which is then pyrolysed. It is also possible to deposit pyrolytic carbon within the interstitial cavities of such a substrate from the vapour phase.

To assist the coating material to perform its filling function, it is necessary for the interstitial cavities of the substrate to be uniform in size and to be uniformly distributed, and to be in good communication with one another and with the exterior.

An object of this invention is to provide such substrates.

In addition, for certain purposes, attempts have been made to obtain composites having substantially isotropic physical properties. For this purpose, it is necessary for the fibres of the substrate to be orientated in a plurality of non-coplanar directions about a given point.

A further object of the invention is to provide substrates having such characteristics.

Finally, for certain purposes, it is desirable to produce composite materials having maximum density. To achieve this object, it is necessary for the ratio between the volume of the substrate and the volume of the final composite body to be as high as possible.

Accordingly, a further object of the invention is to provide substrates having a high ratio of volume of substate to the volume of the final composite.

To achieve these objects, a number of methods have already been proposed. One of the simplest of these consists in uniting together groups of filaments into basic shaped members such as rods and then assembling these members along three mutually orthogonal axes. Two principal difficulties have been encountered in putting this method into practice. The interstitial voids are large because of the method of construction, the voids constituting approximately 40% in the case when cylindrical rods are used. In effect, when cylindrical filaments are aligned contiguously in three mutually orthogonal directions, an elementary cube having an edge which measures half the pitch of the assemblage contains $3 \times \frac{1}{4}$ cylinders of fibres and thus the ratio of the volume of the substrate to the total volume is approximately 60%. In addition, it is difficult for a coating material to gain access to the interstitial voids, in such a structure, particularly when such coating material is deposited from the vapour phase.

It is difficult to envisage mechanising a process of constructing the substrate rob by rod when the pitch is fine.

Another known method consists in threading cloth made from threads which have been woven in two mutually orthogonal directions onto metal wires perpendicularly to the wires, and in subsequently replacing the wires by strands of fibres. This method has the following disadvantages. Only a limted number of the cloths can be threaded onto the metal wires, thus restricting the thickness of the final substrate; the method is difficult to put into practice since the positioning of the cloths is a delicate operation and the replacement of the metal wires by the threads of fibre is a lengthy and laborious technique: finally, the method cannot be automated when the distance between two metal wires becomes small, for example, of the order of one millimeter.

SUMMARY OF THE INVENTION

The present invention enables the inherent disadvantages of the above-outlined methods to be overcome and affords advantages which will be subsequently indicated.

Such method of forming fibre substrates intended for the production of composite bodies, is characterised in that it comprises of following steps:

(a) filaments or threads are first bonded together by means of a binder so as to form a flat sheet;

(b) the said first sheet is then perforated in at least selected areas, the perforations being fine and substantially uniform in size and distribution over at least selected areas of the sheet and forming the pattern of a grid in those areas;

(c) the perforated sheet is subdivided into a plurality of substantially identical smaller flat sheets, each small sheet carrying the pattern of at least one grid;

(d) the said smaller flat sheets are then stacked, one upon another, to form a stack of the desired height in such a manner that the perforations in one sheet overlie the perforations in the immediately underlying sheet of said stack and thus form passages through the stack and (e) there are thereafter threaded through the passages in the thus formed stack, strands or rods which have been formed from fibrous filaments or threads which have been bound together with a binder.

The binder or binders which have been used to join together the filaments or threads may then be removed by any suitable method or converted into any desired product.

The filaments used as starting materials may be of various kinds such as: an aromatic polyamide, carbon, graphite or a polyacrylonitrile. They may be of the same or different binders in the flat sheet and in the strands or rods. Other fibrous materials may be used depending upon the intended end use of the product.

BRIEF DESCRIPTION OF THE DRAWINGS

The drawing shows a single flat sheet provided with squared pitch perforations.

DESCRIPTION OF THE PREFERRED EMBODIMENTS

When it is desired to produce a substrate consisting wholly of carbon, it is possible, for example, to use filaments of a carbon precursor material, such as a crosslinked acrylonitrile polymer as the material from which to form the flat sheet, and carbon fibres to form the strands or rods. After construction by the steps outlined above, the substrate is subjected to heat treatment to convert the precursor material into carbon, and what is finally obtained is a substrate consisting wholly of carbon which is ready to undergo conventional coating treatments.

The filaments in the flat sheets may be arranged in various ways and, in particular, in the form of a woven textile material, the threads of which are orientated in two directions, or are in the form of unidirectional sheets.

When the flat sheets are based upon woven textile materials, the threads of which have been woven in two directions, the angle at which they are woven may be 90°. In this case, the perforations may be made in the directions assumed by the threads and a three directional substrate will finally be obtained.

The angle at which the threads are woven may also be some angle other than 90°. In this case, the perforations may be aligned with one of the directions of the threads and in a direction orthogonal thereto, and having a squared pitch. It is then merely necessary to stack the smaller sheets, which have already been cut square one upon another, with the directions of the threads in adjacent layers to obtain a multidirectional final substrate.

When the flat sheets are sheets comprised of unidirectional filaments, the perforations may be made along the direction of the filaments and along a direction orthogonal thereto, and having a square pitch. The smaller sheets, having been cut square, are then stacked one upon another in such a way that the filaments in one smaller sheet are orthogonal to those in the adjoining sheets; this results in a three-directional substrate being obtained.

The geometrical configuration of the grid formed by the perforations may vary. It may have a square pitch, as indicated above and as shown in the accompanying drawing, but it may also have a hexagonal configuration. In this latter case, for example, by using unidirectional sheets and allowing the directions of the filaments or threads constituting the sheets to intersect at an angle of 60° at the time of stacking, four-directional substrates may be obtained.

It is to be understood that other ways of perforating and superimposing the smaller sheets can be adopted without departing from the scope of the invention.

The substrates which are obtained by the method of the present invention do in fact have the desired properties viz:

(a) in all cases the interstitial cavities are uniform and are uniformly distributed and in good communication one with another and with the exterior, which arrangement facilitates subsequent filling by the coating material when the composite is produced, (b) by adjusting the orientation of the filaments or threads at the various stages of the method it is possible to obtain substrates the filaments or threads of which are orientated in a plurality of non-coplanar directions about a given point, thus enabling composite bodies having substantially isotropic properties to be subsequently obtained, (c) it is possible to obtain very dense substrates: the ratio between the volume of the substrate and that of the final composite may reach a value of substantially 0.8 when the perforations have a squared pitch.

In addition, the method has the following advantages:

(i) thin sheets having fine pores may be used, which assist in the subsequent densification of the composite body;

(ii) the cutting and perforation of the sheets can be automated, as also can the stacking of the smaller sheets and the insertion of the strands or rods;

(iii) the pitch of the perforations may be quite small. A pitch of 0.5 mm is feasible.

Finally, in forming the sheets, when use is made of filaments which have been formed from a cross-linked polymer and which are subsequently carbonised by a final heat treatment, the latter gives rise to shrinkage which enables a substrate having excellent cohesion to be obtained and also enables the pitch of the perforations to be reduced.

The substrates obtained by the method of the present invention are well suited to the various coating techniques intended to convert them into composite bodies for widely diverse applications such as: nozzles, spacecraft re-entry nosetips and aircraft brakes.

The following non-limiting example illustrates the method of the invention.

EXAMPLE

This example relates to the production of a substrate wholly composed of carbon.

Filaments made of cross-linked polyacrylonitrile together with a binder are shaped into the form of a unidirectional sheet 0.25 mm thick and having a filling coefficient of 0.9.

This sheet is automatically converted into smaller, square sheets each having sides 200 mm long and comprising:

(a) an area measuring 160×160 mm provided with peforations 0.7 mm in diameter having a squared pitch of 1.4 mm which are cut out along the direction of the fibres and in a direction orthogonal thereto; and (b) margins provided with eight guiding perforations each measuring 5×10 mm.

One thousand smaller sheets prepared in this way are threaded onto eight metal guides supported by a supporting frame and having the same dimensions as the smaller sheets while causing the sheets to intersect in such a way that the filaments of one smaller sheet are orthogonal to the filaments in adjoining sheets. The fine perforations in the thousand sheets are located exactly facing one another and form channels through which are threaded rods of high modulus carbon fibres which have been stiffened with paraffin and which have a diameter of 0.4 mm. The filling coefficient in a direction perpendicular to the sheets is 0.85.

The filling co-efficient of the substrate is thus of the order of 0.76.

The substrate obtained as described above is subjected to heat treatment at 1200° C. which removes the temporary binders and converts the filaments of the sheets into high-modulus carbon fibres. What is finally obtained is a substrate consisting entirely of carbon, the denseness of which has been increased by shrinkage, whilst simultaneously causing the pitch of the grid of rods to alter to approximately 1.25 mm.

This substrate is particularly suitable for the chemical deposition of carbon from the vapour phase. The final density of the composite which is obtained by such deposition can be as high as 1.9.

What is claimed is:

1. The method of forming a fibrous substrate for use in the production of a composite body from fibrous filaments or threads which comprises the steps of:

(a) forming said filaments or threads and a binder into a coherent flat sheet;

(b) cutting perforations in said coherent flat sheet, said perforations being fine and substantially uniform in size and distribution over at least selected areas of said sheet and forming the pattern of a grid in said selected areas;

(c) subdividing said perforated sheet into a plurality of substantially identical smaller flat sheets, each carrying the pattern of at least one grid;

(d) stacking said smaller flat sheets, one upon another, to form a stack of desired height in such a manner that the perforations in one sheet overlie the perforations in the immediately underlying sheet of said stack and thus form passages through the stack; and (e) thereafter threading through said passages in the thus formed stack strands or rods formed from fibrous filaments or threads which have been bound together with a binder.

2. The method of claim 1 in which said threads have first been formed as a woven textile material and then bonded together with said binder and formed into a coherent flat sheet.

3. The method of claim 2 in which said threads have been woven in two directions disposed at right angles and then bonded together by said binder and said perforations have been cut in the resulting sheet along the directions taken up by said threads.

4. The method of claim 2 in which said threads have been woven in two directions disposed at an angle other than a right angle to one another and bonded together by said binder and said perforations have been cut in the resulting sheet along one of the directions taken up by said threads and along a direction orthogonal thereto with said perforations having a squared pitch, the resulting perforated sheet is then square cut into substantially identical smaller sheets and said smaller sheets are then stacked with the directions followed by the threads in adjoining stacked sheets intersecting.

5. The method of claim 1 in which said filaments have first been formed as a non-woven textile material with said filaments disposed unidirectionally and bonded together by said binder and formed into a flat sheet.

6. The method of claim 5 in which perforations are made in the resulting flat sheet along the direction taken up by the filaments and along a direction orthogonal thereto with said perforations having a squared pitch, the resulting perforated sheet is then square cut into substantially identical smaller sheets and said smaller sheets are then stacked with the directions followed by said filaments in adjoining stacked sheets intersecting.

7. The method of claim 5 in which perforations are cut in the resulting flat sheet in the form of a hexagonal grid, the resulting perforated sheet then being cut into substantially identical smaller sheets and said smaller sheets are then stacked with the directions followed by said filaments in adjoining stacked sheets intersecting at an angle of 60°.

8. The method according to claim 1 in which said filaments or threads consist of a substance selected from the group consisting of aromatic polyamides, carbon, graphite and fibrous carbon precursor materials.

9. The method of claim 8 in which said carbon precursor material is polyacrylonitrile.

10. A fibrous substrate which has been produced by the method claimed in claim 1.

11. A fibrous substrate which has been produced by the method claimed in claim 8.

* * * * *